US009650560B2

(12) United States Patent
Muthusamy et al.

(10) Patent No.: US 9,650,560 B2
(45) Date of Patent: May 16, 2017

(54) METHODS OF CEMENTING AND LASSENITE-CONTAINING CEMENT COMPOSITIONS

(71) Applicant: Halliburton Energy Services, Inc., Houston, TX (US)

(72) Inventors: Ramesh Muthusamy, Pune (IN); Tushar Gosavi, Surat (IN); Rahul Chandrakant Patil, Pune (IN)

(73) Assignee: Halliburton Energy Services, Inc., Houston, TX (US)

(*) Notice: Subject to any disclaimer, the term of this patent is extended or adjusted under 35 U.S.C. 154(b) by 425 days.

(21) Appl. No.: 14/015,643

(22) Filed: Aug. 30, 2013

(65) Prior Publication Data

US 2015/0060070 A1 Mar. 5, 2015

(51) Int. Cl.
*C09K 8/46* (2006.01)
*C04B 28/02* (2006.01)
*E21B 43/14* (2006.01)
*C09K 8/467* (2006.01)

(52) U.S. Cl.
CPC .............. *C09K 8/467* (2013.01); *C04B 28/02* (2013.01)

(58) Field of Classification Search
CPC ................................. C09K 8/467; C04B 28/02
See application file for complete search history.

(56) References Cited

U.S. PATENT DOCUMENTS

| | | | | | |
|---|---|---|---|---|---|
| 2,805,719 | A | * | 9/1957 | Anderson | C09K 8/5045 106/721 |
| 3,499,491 | A | * | 3/1970 | Wyant | C04B 28/26 106/607 |
| 3,832,196 | A | * | 8/1974 | Broussard | C04B 28/02 106/706 |
| 3,876,005 | A | * | 4/1975 | Fincher | C04B 28/02 166/292 |
| 5,346,012 | A | * | 9/1994 | Heathman | C04B 7/527 106/727 |
| 5,352,288 | A | * | 10/1994 | Mallow | C04B 28/18 106/605 |
| 6,761,765 | B2 | * | 7/2004 | Lu | C04B 24/08 106/2 |
| 6,989,057 | B2 | * | 1/2006 | Getzlaf | C04B 14/047 106/606 |
| 7,448,449 | B2 | * | 11/2008 | Di Lullo Arias | C04B 28/02 106/724 |
| 7,459,019 | B2 | * | 12/2008 | Barlet-Gouedard | C04B 14/106 106/705 |
| 7,631,692 | B2 | * | 12/2009 | Roddy | C04B 28/02 106/679 |
| 7,717,988 | B1 | * | 5/2010 | Chappell | C04B 26/00 106/15.05 |
| 7,799,128 | B2 | * | 9/2010 | Guynn | C04B 28/02 106/705 |
| 7,855,170 | B2 | * | 12/2010 | Perera | C03C 3/062 106/286.1 |
| 7,972,432 | B2 | * | 7/2011 | Guynn | C04B 28/02 106/705 |
| 8,118,929 | B2 | * | 2/2012 | Al-Yami | C04B 28/02 106/713 |
| 8,323,399 | B2 | * | 12/2012 | Guynn | C04B 28/02 106/705 |
| 8,895,487 | B2 | * | 11/2014 | Patil | C09K 8/467 166/292 |
| 8,920,556 | B2 | * | 12/2014 | Shendy | C04B 24/10 106/708 |
| 8,944,165 | B2 | * | 2/2015 | Patil | C09K 8/467 166/292 |
| 9,022,147 | B2 | * | 5/2015 | Ravi | C04B 28/02 175/65 |
| 2002/0100394 | A1 | * | 8/2002 | Lu | C04B 24/08 106/696 |
| 2002/0117090 | A1 | * | 8/2002 | Ku | C04B 28/02 106/737 |
| 2004/0107877 | A1 | * | 6/2004 | Getzlaf | C04B 14/047 106/813 |
| 2005/0160945 | A1 | * | 7/2005 | Barlet-Gouedard | C04B 14/106 106/718 |
| 2006/0185561 | A1 | * | 8/2006 | Fyten | C04B 28/04 106/672 |
| 2007/0039734 | A1 | * | 2/2007 | Di Lullo Arias | C04B 28/02 166/292 |
| 2008/0066655 | A1 | † | 3/2008 | Fraser | |
| 2009/0200029 | A1 | * | 8/2009 | Roddy | C04B 28/02 166/293 |
| 2009/0260545 | A1 | * | 10/2009 | Al-Yami | C04B 28/02 106/801 |
| 2009/0288830 | A1 | * | 11/2009 | Perera | C03C 3/062 166/293 |

(Continued)

OTHER PUBLICATIONS

Lassen County Planning and Building Services Department. "Lassen County General Plan 2000." <http://old.lassencounty.org/govt/dept/planning_building/planning_division/documents/07-NaturalResourcesElementpages3-31to3-63.pdf>. Lassen County, California. 2000. Web. Jun. 27, 2016.*
Ballard, Zachoriah J., et al. Colorado Department of Transportation DTD Applied Research and Innovation Branch. "Alternate Mitigation Materials for Alkali-Silica Reaction (ASR) in Concrete." Centennial, Colorado. 2008.*
International Search Report and Written Opinion issued by ISA/KR for PCT/US2014/044659 on Oct. 14, 2014 (15 pages).
Patent Examination Report No. 1 issued by the Australian Patent Office for Australian Patent Application No. 2014311805 on Mar. 29, 2016, 4 pages.
Examination Report for Canadian Patent Application No. 2,912,939, prepared by the Canadian Intellectual Property Office dated Jun. 29, 2016. (5 pages).
Azar, Drilling Engineering, pp. 424 and 425, published 2007, published by PennWell Corporation, available at https://books.google.com/books?id=eseViO982VgC.†

(Continued)

*Primary Examiner* — Zakiya W Bates
*Assistant Examiner* — Crystal J Miller
(74) *Attorney, Agent, or Firm* — Haynes and Boone, LLP

(57) ABSTRACT

Cement compositions and methods of making the same are provided. The composition comprises cement or lime, water and Lassenite, a pozzolanic strength retrogression inhibitor.

14 Claims, No Drawings

(56) References Cited

U.S. PATENT DOCUMENTS

| | | | | |
|---|---|---|---|---|
| 2010/0089293 | A1* | 4/2010 | Guynn | C04B 28/02 106/709 |
| 2010/0282466 | A1* | 11/2010 | Brenneis | C04B 28/021 166/293 |
| 2010/0313795 | A1* | 12/2010 | Guynn | C04B 28/02 106/706 |
| 2011/0042088 | A1* | 2/2011 | Gassemzadeh | C04B 14/46 166/292 |
| 2011/0259246 | A1* | 10/2011 | Guynn | C04B 28/02 106/707 |
| 2012/0305248 | A1* | 12/2012 | Ravi | C04B 28/02 166/285 |
| 2013/0153223 | A1* | 6/2013 | Muthusamy | C04B 28/02 166/294 |
| 2013/0199416 | A1* | 8/2013 | Shendy | C04B 24/10 106/708 |
| 2014/0076204 | A1* | 3/2014 | Brenneis | C04B 28/02 106/716 |
| 2014/0196901 | A1* | 7/2014 | Patil | C09K 8/467 166/292 |
| 2014/0238275 | A1* | 8/2014 | Patil | C09K 8/467 106/733 |
| 2014/0256602 | A1* | 9/2014 | Ravi | C04B 28/02 507/108 |

OTHER PUBLICATIONS

WorldOil, Cementing Products and Additives, World Oil, Mar. 1999, pp. 1, 2, 4, 6, 13 and 21, published Mar. 1999, published by Gulf Publishing Company, available at http://www.worldoil.com/magazine/1999/march-1999.†

LassenCounty, Lassen County General Plan 2000, pp. 44 and 45, published Sep. 1999, published by Lassen County California, available at http://www.lassencounty.org/govt/dept/planning_building/planning_division/documents/07-NaturalResourcesElementpages3-31to3-63.pdf.†

Kogel, Pozzolans and Supplementary Cementitious Materials, Industrial Minerals and Rocks Commodities Markets and Uses 7th Edition, pp. 1163 and 1169, published 2006, published by the Society for Mining, Metallurgy and Exploration, Inc., available at http://www.amazon.com/Industrial-Minerals-Rocks-Commodities-Markets/dp/0873352335.†

ASTM, Standard Specification for Coal Fly Ash and Raw or Calcined Natural Pozzolan for Use in Concrete, pp. 1 and 2, published 2005, published by the American Society for Testing and Materials (ASTM), available at http://www.astm.org/DATABASE.CART/HISTORICAL/C618-05.htm.†

Shi, Validating the Durability of Corrosion Resistant Mineral Admixture Concrete, p. A70, published 2010, published by the California State Department of Transportation, available from the U.S. National Technical Reports Library (NTRL) at http://ntrl.ntis.gov.†

Ballard, Alternate Mitigation Materials for Alkali Silica Reaction (ASR) in Concrete, pp. 20, 25, C1, E7 and E8, published 2008, published by the Colorado Department of Transportation, available from the U.S. National Technical Reports Library (NTRL) at http://ntrl.ntis.gov.†

Glauz, Evaluate the Use of Mineral Admixtures in Concrete to Mitigate Alkali Silica Reactivity, pp. 9, 12, 13, 20 and 21, published Dec. 1996, published by the California State Department of Transportation, available from the U.S. National Technical Reports Library (NTRL) at http://ntrl.ntis.gov.†

Mather, Admixtures, pp. 7, 8, 9 and 18, published 1970, published by the Army Engineering Waterways Experiment Station Vicksburg Mississippi, available from the U.S. National Technical Reports Library (NTRL) at http://ntrl.ntis.gov.†

Purebase, Raw Lassenite Pozzolan Material Safety Data Sheet, p. 1, published Mar. 23, 2013, published by Purebase, Inc., available at http://purebase.com/wp-content/uploads/2015/02/Purebase-Material-Safety-Handling-Sheet-MSHS-vMarch-2013.pdf.†

Shenk, The Geology and Development of the White Cliffs Diatomite Deposit, Mammoth AZ, p. 4, published 1988, published by the Arizona Department of Mines & Mineral Resources, available at http://www.onemine.org/search/summary.cfm/The-Geology-And-Development-Of-The-White-Cliffs-Diatomite-Deposit-Mammoth-AZ?d=7DE2070D247F9A9722CB30315F8054E010DA4BE7D75933F2D85877339C457BCE172112&fullText=az%20claims.†

Helffrich, Development Analysis of the Mammoth Diatomite Deposit, pp. 3, 4, 36 and 42, published 1963, published by American Diatomes, Inc., available from the Arizona State Library, Archives & Public Records Division, Phoenix, AZ.†

Thompson, Recent Development in Oil Well Cementing, pp. 1, 4 and 5, published 1959, published by the Venezuelan Society of Petroleum Engineers of AIME, available at https://www.onepetro.org/conference-paper/SPE-1417-G.†

Miller, Use of Diatomaceous Earth as a Siliceous Material in the Formation of Alkali Activated Fine Aggregate Limestone Concrete, pp. 17, 18, 22, 31, 32 and 110, published 2009, published by Drexel University, available at https://idea.library.drexel.edu/islandora/object/idea%3A3029.†

Barger, Production and Use of Calcined Natural Pozzolans in Concrete, pp. 73, 74, 75, published Dec. 2001, published by the American Society for Testing and Materials (ASTM), available at http://www.astm.org/DIGITAL_LIBRARY/JOURNALS/CEMENT/PAGES/CCA10478J.htm.†

Revil, Successful Use of a Liquid Strength Retrogression Prevention Additive, pp. 1, 2, 4, 6 and 8, published 2007, published by the Offshore Mediterranean Conference, available at https://www.onepetro.org/conference-paper/OMC-2007-083.†

California, California Geology, vol. 34 No. 9, pp. 185 and 189, published Sep. 1981, published by the California Division of Mines and Geology, available at http://cgsdigitalarchive.conservation.ca.gov/cdm/ref/collection/p16780co112/id/19655.†

WPC, Lassenite SR Cement Additives Specification Package, pp. 1, 5, 6, 9, 14, 15, 16, 17, 18, 78, 79, 80, 81, published Mar. 2010, published by Western Pozzolan Corp. of Doyle, CA.†

Barnard, A Scientific Study of Lassenite, pp. 8, 9, 35, 36 and 38, published 2010, published by Camosun College, available at http://www.aquasoilss.com/uploads/Clean_Water_Team_Scientific_Study_Of_Lassenite.pdf.†

Michaux, Cement Chemistry and Additives, Oilfield Review, pp. 18, 19, 20, 21, 22, 23, 24 and 25, published Apr. 1989, published by Schlumberger, available at http://www.slb.com/resources/oilfield_review/en/1989/or1989_apr.aspx.†

Ostroot, Improved Compositions for Cementing Wells with Extreme Temperatures, pp. 277, 278, 279, 280, 281, 282, 283 and 284, published Mar. 1961, published by Journal of Petroleum Technology, available at https://www.onepetro.org/journal-paper/SPE-1513-G-PA.†

ACI, Use of Raw or Processed Natural Pozzolans in Concrete, pp. 1, 2, 3, 4, 5, 7, 8, 9, 10, 11, 15, 19, 20 and 21, published 2001, published by American Concrete Institute, available at http://metakaolin.ru/Documents/NaturalPozzolans.pdf.†

Mineral Information Service, California Mining Review, 1967, p. 25, published Feb. 1968, published by California Division of Mines and Geology, available at ftp://ftp.consrv.ca.gov/pub/dmg/pubs/cg/1968/21_02.pdf†

Guarina, Cement Slurries for Geothermal Wells Cementing, pp. 127, 129, 130 and 134, published 1994, published by the Ministry of Science and Technology of the Republic of Croatia, available at http://www.scribd.com/doc/132391943/Cement-Slurries-for-Geothermal-Wells-Cementing#scribd.†

Taylor, Preconceptual Systems and Equipment for Plugging of Man Made Accesses to a Repository in Basalt, pp. 227, 229, 232 and 236, published Sep. 1980, published by Technical Information Center Oak Ridge Tennessee, available from the U.S. National Technical Reports Library (NTRL) at http://ntrl.ntis.gov.†

Simmons, Properties of Portland Cement Concretes Containing Pozzolanic Admixtures, pp. 2, 3, 4, 5, 8, 9, 10 and 14, published Apr. 1981, published by the U.S. Federal Highway Administration, available from the U.S. National Technical Reports Library (NTRL) at http://ntrl.ntis.gov.†

(56) References Cited

OTHER PUBLICATIONS

Battelle Project Management Division, The Status of Borehole Plugging and Shaft Sealing for Geological Isolation of Radioactive Waste, pp. 3, 14, 17, 19, 20, 22, 23, 74, 116 and 118, published 1979, published by Technical Information Center Oak Ridge Tennessee, available from the U.S. National Technical Reports Library (NTRL) at http://ntrl.ntis.gov.†

Chilingarian, Surface Operations in Petroleum Production 2, pp. 64, 65 and 69, published 1989, published by Elsevier Science Publishers, available at http://www.scribd.com/doc/40042898/Surface-Operations-in-Petroleum-Production-II#scribd.†

\* cited by examiner
† cited by third party

METHODS OF CEMENTING AND LASSENITE-CONTAINING CEMENT COMPOSITIONS

FIELD OF THE INVENTION

The present embodiments generally relate to subterranean cementing operations and, more particularly, to methods of cementing and cement compositions including Lassenite, a pozzolanic strength retrogression inhibitor. As a pozzolan, Lassenite is included in the cement compositions to decrease the cost of the cement compositions without adversely affecting desirable properties thereof, such as setting time and compressive strength. As a strength retrogression inhibitor, Lassenite inhibits or prevents a decline in the compressive strength of the cement compositions over time.

BACKGROUND

The following paragraphs contain some discussion, which is illuminated by the innovations disclosed in this application, and any discussion of actual or proposed or possible approaches in this Background section does not imply that those approaches are prior art.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can include, without limitation, an oil, gas, or water production well, or an injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During well completion, it is common to introduce a cement composition into an annulus in a wellbore. For example, in a cased-hole wellbore, a cement composition can be placed into and allowed to set in an annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, squeeze cementing, or gravel packing operations.

It is common to include a filler in a cement composition. The filler can help reduce the overall cost of the cement composition. One type of filler that is commonly included in a cement composition is a pozzolan. As used herein, a "pozzolan" is a siliceous or siliceous and aluminous material which, in itself, possesses little or no cementitious value but which will, in finely divided form and in the presence of water, chemically react with a source of calcium at a temperature of 71° F. (22° C.) to form compounds possessing cementitious properties.

As used herein, the phrase "cementitious properties" means the ability to bind materials together and set. It is to be understood that the term "pozzolan" does not necessarily indicate the exact chemical make-up of the material, but rather refers to its capability of reacting with a source of calcium and water to form compounds possessing cementitious properties. When a pozzolan is mixed with water, the silicate phases of the pozzolan can undergo a hydration reaction and form hydration products of calcium silicate hydrate (often abbreviated as C-SH) and also possibly calcium aluminate hydrate. A pozzolan in general is less expensive than cement and can generally be included in a cement composition up to about 40% by weight of the cement. Therefore, a pozzolan can not only decrease the overall cost of the cement composition, but also will not adversely affect the desirable properties of the cement composition (e.g., the compressive strength or setting time).

The degree to which a material functions as a pozzolan can be determined by the pozzolanic activity of the material. The pozzolanic activity of a pozzolan is the reaction rate between the pozzolan and a source of calcium (e.g., $Ca^{2+}$, calcium oxides "CaO", or calcium hydroxides "$Ca(OH)_2$") in the presence of water. The pozzolanic activity can be measured by determining the amount of calcium the pozzolan consumes over time or by determining the compressive strength of a pozzolan composition containing the pozzolan and water or a cement composition containing cement, the pozzolan, a source of calcium, and water.

Strength retrogression is a decline in the compressive strength of a cement composition over time, especially at elevated temperatures. The decline is more pronounced at temperatures above 230° F. (110° C.). Therefore, it is common to include a strength retrogression inhibitor in a cement composition. Strength retrogression inhibitors can function to inhibit or prevent a decline of the compressive strength of a cement composition over time. However, pozzolans are generally not considered to be strength retrogression inhibitors. This means that in order to reduce the cost of a cement composition while still maintaining the desirable properties of the composition, both a pozzolan and a strength retrogression inhibitor must be included in the composition for use in higher-temperature wells. The addition of two separate additives may not reduce the cost as much as may be desirable and requires more time by having to incorporate both additives into the cement composition.

Typically, fly ash, silica fume, metakaolin and pumice have been used as pozzolans. However, consistency problems can occur because samples can have many origin points. Therefore, a need exists for a single origin pozzolan that can also act as a strength retrogression inhibitor.

DETAILED DESCRIPTION

It is to be understood that the following disclosure provides many different embodiments, or examples, for implementing different features of various embodiments. Specific examples of components are described below to simplify and exemplify the present disclosure. These are, of course, merely examples and are not intended to be limiting.

According to certain embodiments, a cement composition is provided. According to certain embodiments, the cement composition includes cement, an aqueous fluid, and a pozzolanic strength retrogression inhibitor. In certain other embodiments, modifying additives may be included in the cement composition.

According to certain embodiments, the cement composition includes a hydraulic cement. According to certain embodiments, a variety of hydraulic cements may be utilized, including, but not limited to, those comprising calcium, aluminum, silicon, oxygen, iron, and/or sulfur, which set and harden by a reaction with water. Suitable hydraulic cements include, but are not limited to, Portland cements, gypsum cements, high alumina content cements, slag cements, high magnesia content cements, shale cements, acid/base cements, fly ash cements, zeolite cement systems, kiln dust cement systems, microfine cements, metakaolin, and combinations thereof. In certain embodiments, the hydraulic cement may comprise a Portland cement. The Portland cements that are suitable for use in certain embodiments are classified as Classes A, C, H, and G cements according to the American Petroleum Institute, API Specification for Materials and Testing for Well Cements, API Specification 10, Fifth Ed., Jul. 1, 1990. In certain embodiments, the cement is Class G or Class H cement.

According to certain embodiments, the cement composition includes an amount of an aqueous fluid sufficient to form a pumpable cementitious slurry. In certain embodiments, the aqueous fluid is water. The water may be fresh water, brackish water, saltwater, or any combination thereof. The water may be present in the cement composition in an amount of from about 20% to about 80% by weight of cement ("bwoc"), from about 28% to about 60% bwoc, or from about 36% to about 66% bwoc. In certain embodiments, the density of the cement composition in slurry form is from about 7 pounds per gallon (ppg) to about 20 ppg, from about 10 ppg to about 18 ppg, or from about 13 ppg to about 17 ppg.

According to certain embodiments, the cement composition includes a water-soluble salt. Suitable water-soluble salts include sodium chloride, calcium chloride, calcium bromide, potassium chloride, potassium bromide, magnesium chloride, and any combination thereof. According to certain embodiments, the cement composition may include a water-soluble salt in a range of from about 5% to about 36% by weight of the aqueous fluid.

According to certain embodiments, the pozzolanic strength retrogression inhibitor includes Lassenite, a crystalline porous aluminosilicate. On the basis of an oxide analysis, Lassenite includes at least silicon dioxide ($SiO_2$) and aluminum oxide ($Al_2O_3$). According to certain embodiments, the Lassenite may be present in the cement composition in an amount of from about 10% to about 40% by weight of the cement.

According to certain embodiments, the Lassenite includes additional oxides, such as sodium oxide ($Na_2O$), magnesium oxide (MgO), sulfur trioxide ($SO_3$), potassium oxide ($K_2O$), calcium oxide (CaO), titanium dioxide ($TiO_2$), iron (III) oxide ($Fe_2O_3$), and combinations thereof in any proportion. In certain embodiments, the $SiO_2$ and $Al_2O_3$ comprise at least 80% by weight of the total oxides of the Lassenite. According to certain embodiments, the $SiO_2$ is present in the range of about 65% to about 75% by weight of the total oxides of the Lassenite. According to certain embodiments, the $Al_2O_3$ is present in the range of from about 10% to about 15% by weight of the total oxides of the Lassenite.

According to certain embodiments of the cement composition, Lassenite has pozzolanic activity and functions as a strength retrogression inhibitor. Specifically, according to certain embodiments, cement compositions that include Lassenite attain a compressive strength of 50 psi after curing for about 2 to about 3 hours at 190° F. Additionally, according to certain embodiments, cement compositions that include Lassenite attain a compressive strength of from about 3200 psi to about 3500 psi after curing for about 24 hours at 190° F.

According to certain embodiments of the cement composition, Lassenite not only functions as a strength retrogression inhibitor, Lassenite also increases the compressive strength of cement compositions including Lassenite. In certain embodiments of the present invention, the compressive strength of cement compositions including Lassenite increased by a factor of from about 5% to about 10% when measured from about 24 to about 72 hours after cure at a temperature of 300° F. (149° C.) and a pressure of 3,000 psi (20.7 MPa).

According to certain embodiments, the cement composition includes one or more modifying additives. Such additives include, without limitation, resins, latex, stabilizers, silica, microspheres, aqueous superabsorbers, viscosifying agents, suspending agents, dispersing agents, salts, accelerants, surfactants, retardants, defoamers, settling-prevention agents, weighting materials, fluid loss control agents, elastomers, vitrified shale, gas migration control additives, and formation conditioning agents.

According to an embodiment, a cementitious composition containing Lassenite, a calcium source, and an aqueous fluid is provided. According to certain embodiments, the calcium source is lime and the lime is present in the cementitious composition in an amount of from about 15% to about 40% by weight of Lassenite ("bwol"). In certain embodiments, the aqueous fluid is water as described above. In certain other embodiments, the cementitious composition including Lassenite and lime can further include modifying additives as described above. According to certain embodiments, the cementitious composition including Lassenite, lime and water attains a compressive strength of from about 500 psi to about 700 psi at 180° F. after curing for about 24 hours.

According to certain embodiments, a method for cementing in a subterranean formation is provided. The method comprises introducing a composition into a subterranean formation. According to certain embodiments, the composition includes cement, an aqueous fluid, and Lassenite, as described above. According to certain other embodiments, the composition includes Lassenite, a calcium source and an aqueous fluid, as described above.

The following examples are illustrative of the compositions and methods discussed above.

Examples

Oxide Analysis of Lassenite

Lassenite was obtained from AquaFirst Technologies, Inc. An X-Ray Fluorescence (XRF) oxide analysis was performed on the Lassenite sample and the results are summarized in Table 1, below:

TABLE 1

Lassenite Composition

| Oxide | Amount (Mole %, by weight) |
|---|---|
| $SiO_2$ | 70.54 |
| $Al_2O_3$ | 12.44 |
| $Na_2O$ | 3.82 |
| $MgO$ | 0.82 |
| $SO_3$ | 1.6 |
| $K_2O$ | 1.48 |
| $CaO$ | 2.32 |
| $TiO_2$ | 0.62 |
| $Fe_2O_3$ | 6.36 |

Phase Analysis of Lassenite

An X-Ray Diffraction (XRD) analysis was performed on an exemplary sample of Lassenite. The results are summarized in Table 2, below.

TABLE 2

Phases present in Lassenite

| Phase | Concentration (%) |
|---|---|
| Clay | 54 |
| Quartz | 8 |
| Sodium Feldspar | 19 |
| Potassium Feldspar | 16 |
| Gypsum | 3 |

Pozzolanic Behavior of Lassenite

In order to assess the pozzolanic behavior of Lassenite, a slurry was formed in which a Lassenite sample was reacted with lime. The composition of the slurry is summarized in Table 3 below:

TABLE 3

Slurry Design (Density: 13.00 ppg)

| Materials | Amount |
|---|---|
| Water | 98.83% by weight of Lassenite (bwol) |
| Lassenite | 100% bwol |
| Lime | 30% bwol |
| Micromax ® | 20% bwol |
| Coatex XP 1629 | 0.3 gal/sk |
| CFR-3L ™ | 0.3 gal/sk |
| Crush strength at 180° F. | |
| 24 hours | 645 psi |
| 96 hours | 1264 psi |

Micromax® is a weight additive and CFR-3L™ is a dispersant that reduces the apparent viscosity and improves the rheological properties of cement slurries. Micromax® and CFR-3L™ are commercially available from Halliburton Energy Services, Inc. Coatex XP 1629 is a carboxylate ether dispersant that reduces the apparent viscosity and improves the rheological properties of a cement slurry. Coatex XP 1629 is commercially available from Coatex, LLC.

The slurry was cured in a water bath at 180° F. As shown in Table 3, the crush strength of the cured composition was 645 psi and 1264 psi at 24 and 96 hours, respectively. These results confirm the pozzolanic activity of Lassenite.

Cement Slurry Preparation

Three cement slurries, each having a density of 15.8 ppg and a composition as set forth in Table 4 below, were prepared for testing purposes.

TABLE 4

Cement Slurry Compositions

| | Class G Cement (%) | Water (% bwoc) | POZMIX A (% bwoc) | Lassenite (% bwoc) | Coatex XP 1629 (gal/sk) |
|---|---|---|---|---|---|
| Cement Slurry A (No additive) | 100 | 45.1 | | | |
| Cement Slurry B (POZMIX A) | 100 | 52.8 | 30 | | |
| Cement Slurry C (Lassenite) | 100 | 49.6 | | 30 | 0.3 |

Cement Slurry A included only cement and water. Cement Slurry B included cement, water and Pozmix® A, a pozzolanic cement additive (fly ash) that is made from burned coal and is commercially available from Halliburton Energy Services. The composition of Pozmix® A is set forth in Table 5 below.

TABLE 5

Oxide Composition of POZMIX ® A

| Oxide | POZMIZ A (% Weight) |
|---|---|
| $Al_2O_3$ | 22.3 |
| $SiO_2$ | 60.5 |
| $K_2O$ | <0.0001 |
| $CaO$ | 0.76 |
| $Fe_2O_3$ | 3.72 |

Cement Slurry C included cement, water, Lassenite and Coatex XP 1629. Cement Slurries A, B and C were dry blended according to API procedure RP 10B-2.

Rheology of the Cement Slurry Containing Lassenite

The rheology of Cement Slurry C in Table 4 was measured using a Fann 35 viscometer. The results are summarized in Table 6 below.

TABLE 6

Rheology of Cement Slurry (75° F.)
Fann 35 Viscometer readings

| RPM | 3 | 6 | 30 | 60 | 100 | 200 | 300 | 600 |
|---|---|---|---|---|---|---|---|---|
| Dial Readings | 18 | 24 | 27 | 41 | 57 | 97 | 148 | 252 |

In Table 6 above, a higher "Dial Reading" indicates a higher viscosity, and therefore less pourability and pumpability. The results shown in Table 6 are within the range that demonstrate that Cement Slurry C which includes Lassenite, was pourable and could be pumped easily.

Compressive Strength Test

Cement Slurries A, B, and C from Table 4 were cured at a constant temperature of 190° F. The compressive strength of the cured samples of Cement Slurries A, B and C from Table 4 were tested for the time it took the samples to reach a compressive strength of 50 psi, and again for their compressive strength at 24 hours using a UCA (Ultrasonic Cement Analyzer). According to typical oilfield processes, a cement slurry must develop a compressive strength of at least 50 psi before commencing further drilling of a well. Therefore, the shorter the time it takes for a cement slurry to reach a compressive strength of 50 psi, the more desirable that cement slurry is for use in oilfield processes. Table 7 summarizes the results of the compressive strength testing.

TABLE 7

Compressive strength at 190° F.

|  | Time for 50 psi HR:MM | 24 hours compressive strength |
|---|---|---|
| Cement Slurry A | 2:19 | 2517 |
| Cement Slurry B | 2:03 | 3493 |
| Cement Slurry C | 2:53 | 3277 |

The results shown in Table 7 demonstrate that Cement Slurry C which includes Lassenite develops compressive strength at a rate and amount which is comparable to Cement Slurry B which includes Pozmix® A. The initial strength development (50 psi) of Cement Slurry C which includes Lassenite was slightly delayed compared to Cement Slurry B which includes Pozmix® A. It is suspected that this is due to the presence of Coatex XP 1629 in Cement Slurry C.

Strength Retrogression Test

Cured samples made from Cement Slurries A, B, and C from Table 4 as well as Cement Slurry D which had a density of 15.8 ppg and included Class G cement, 35% bwoc of SSA-2™ and 56.03% bwoc of water and was prepared in the same manner as Cement Slurries A, B, and C, were tested for strength retrogression. SSA-2™ is coarse silica flour comprised of Oklahoma No. 1 dry sand and is commercially available from Halliburton Energy Services. Strength retrogression was determined by measuring the compressive strength of each of Cement Slurries A, B, C and D at 24 hours and 72 hours and determining the percent change in compressive strength over this time period. Table 8 summarizes the results of the strength retrogression testing.

TABLE 8

Strength Retrogression at 300° F.

| | Compressive Strength (psi) | | | | |
|---|---|---|---|---|---|
| | 6 Hours | 12 Hours | 24 Hours | 48 Hours | 72 Hours | % Change |
| Slurry A | 1731 | 2442 | 2748 | 2609 | 2470 | −10.12 |
| Slurry B | 2058 | 2510 | 2648 | 2350 | 2418 | −8.69 |
| Slurry C | 1710 | 1957 | 2205 | 2416 | 2384 | +8.12 |
| Slurry D | 1569 | 2023 | 2267 | 2292 | 2275 | +0.35 |

As shown in Table 8, Cement Slurry C which included Lassenite did not experience strength retrogression and actually increased in compressive strength from 24 hours to 72 hours. This is a significant result compared to the results for Cement Slurry B which included Pozmix® A which experienced a decrease in compressive strength or a strength retrogression of 8.69% from 24 hours to 72 hours.

While the present invention has been described in terms of certain embodiments, those of ordinary skill in the art will recognize that the invention can be practiced with modification within the spirit and scope of the appended claims.

The present disclosure has been described relative to certain embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method of cementing in a subterranean formation, comprising:
    introducing a cement composition into a subterranean formation; and
    allowing the cement composition to cure and develop compressive strength;
        wherein the cement composition consists essentially of:
            cement;
            an aqueous fluid present in an amount from about 20% to about 80% by weight of the cement;
            a pozzolan present in an amount from about 10% to about 40% by weight of the cement; and
            a modifying additive selected from the group consisting of lime, weighting additives, and dispersants; and
        wherein the pozzolan comprises a crystalline porous aluminosilicate and is a strength retrogression inhibitor; and
        wherein the compressive strength of the cement composition is at least 50 psi three hours after curing at 190° F. and the compressive strength of the cement composition measured at 72 hours is greater than the compressive strength of the cement composition measured at 24 hours.

2. The method according to claim 1, wherein the cement is selected from the group consisting of Portland cements, gypsum cements, high alumina content cements, slag cements, high magnesia content cements, shale cements, acid/base cements, fly ash cements, zeolite cement systems, kiln dust cement systems, microfine cements, metakaolin, and combinations thereof.

3. The method according to claim 1, wherein the aqueous fluid is water selected from the group consisting of fresh water, brackish water, saltwater, and any combination thereof.

4. The method according to claim 3, wherein the cement composition comprises water in an amount selected from about 28% to about 60% by weight of the cement, and from about 36% to about 66% by weight of the cement.

5. The method according to claim 1, wherein the pozzolan comprises silicon dioxide ($SiO_2$) and aluminum oxide ($Al_2O_3$).

6. The method according to claim 5, wherein the silicon dioxide ($SiO_2$) and aluminum oxide ($Al_2O_3$), comprise at least 80% by weight of the total oxide content of the pozzolan.

7. The method according to claim 5, wherein the silicon dioxide ($SiO_2$) comprises from about 65% to about 75% by weight of the total oxide content of the pozzolan; and wherein the aluminum oxide ($Al_2O_3$) comprises from about 10% to about 15% by weight of the total oxide content of the pozzolan.

8. The method according to claim 1, wherein the cement composition develops a compressive strength of from about 3200 psi to about 3500 psi at about 24 hours after curing at 190° F.

9. The method according to claim 1, wherein the cement composition develops compressive strength and the compressive strength increases by a factor of from about 5% to about 10% from about 24 hours to about 72 hours after cure.

10. A method of cementing in a subterranean formation, comprising:

introducing a cementitious composition into a subterranean formation, the cementitious composition consisting essentially of:
  a crystalline porous aluminosilicate pozzolan comprising silicon dioxide ($SiO_2$) and aluminum oxide ($Al_2O_3$), wherein silicon dioxide ($SiO_2$) and aluminum oxide ($Al_2O_3$) are at least 80% by weight of the total oxide content of the pozzolan;
  a calcium source present in an amount from about 15% to about 40% by weight of the pozzolan; and
  an aqueous fluid; and
allowing the cementitious composition to cure and develop compressive strength;
  wherein the pozzolan is a strength retrogression inhibitor; and
  wherein the compressive strength of the cement composition measured at 72 hours is greater than the compressive strength of the cement composition measured at 24 hours.

11. The method according to claim 10, wherein the silicon dioxide ($SiO_2$) comprises from about 65% to about 75% by weight of the total oxide content of the pozzolan; and wherein the aluminum oxide ($Al_2O_3$) comprises from about 10% to about 15% by weight of the total oxide content of the pozzolan.

12. The method according to claim 10, wherein the calcium source comprises lime and wherein the cementitious composition comprises lime in an amount of from about 15% to about 40% by weight of the pozzolan.

13. The method according to claim 10, wherein the aqueous fluid is water selected from the group consisting of fresh water, brackish water, saltwater, and any combination thereof.

14. The method according to claim 10, wherein the cementitious composition develops a compressive strength of from about 500 psi to about 700 psi at about 24 hours after curing at 180° F.

* * * * *